March 9, 1937.  G. S. VON HEYDEKAMPF  2,072,912
LOAD INDICATING SYSTEM
Filed June 29, 1933  3 Sheets-Sheet 1
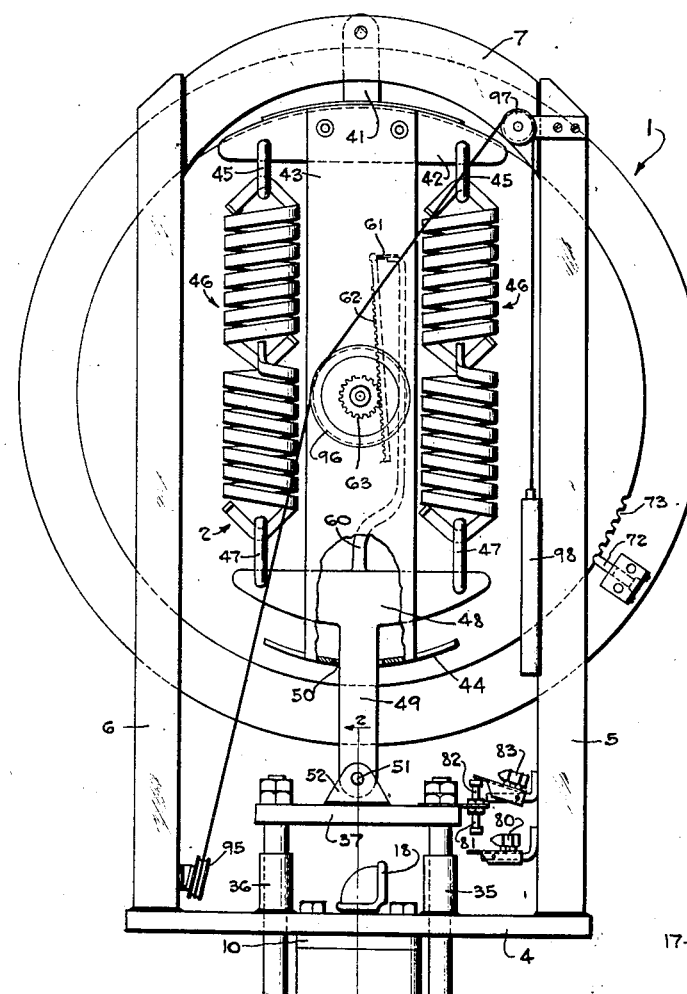
Fig.1
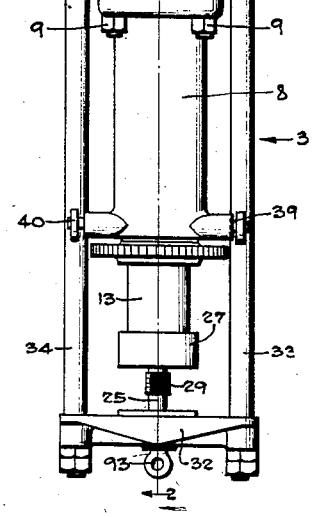
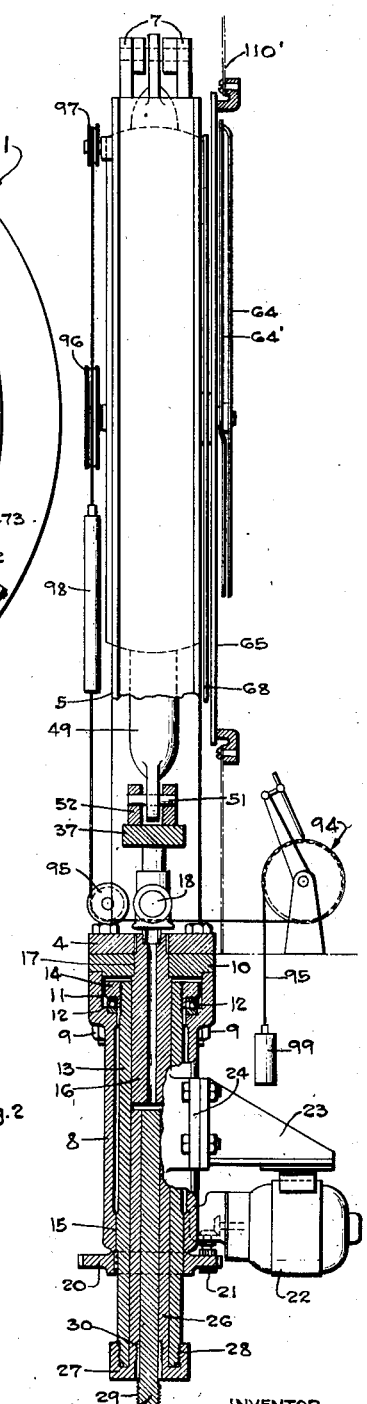
Fig.2
INVENTOR
G. S. von Heydekampf.
BY
ATTORNEY

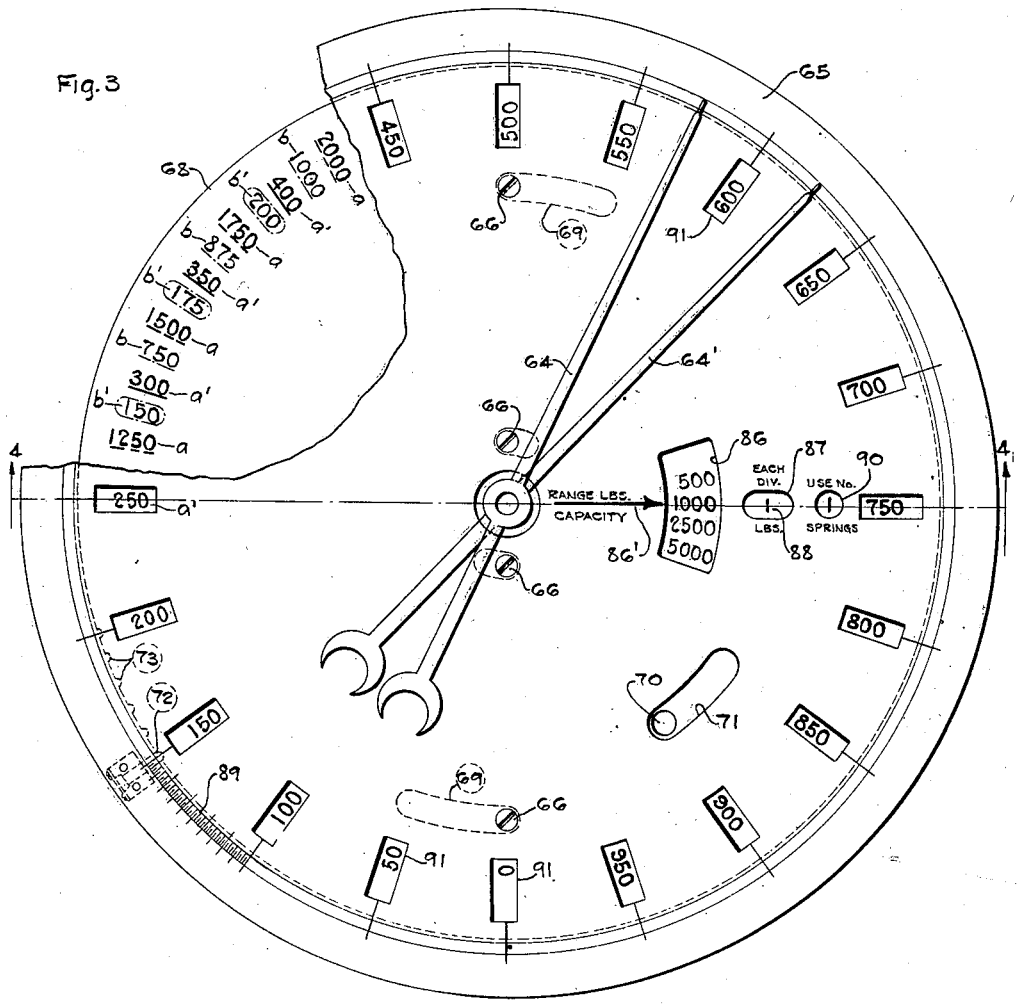
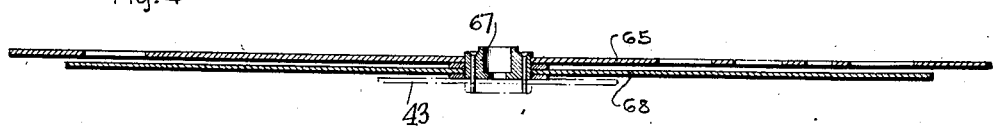

March 9, 1937.  G. S. VON HEYDEKAMPF  2,072,912
LOAD INDICATING SYSTEM
Filed June 29, 1933   3 Sheets-Sheet 3

INVENTOR
G. S. von Heydekampf
BY
ATTORNEY

Patented Mar. 9, 1937

2,072,912

UNITED STATES PATENT OFFICE 2,072,912

LOAD INDICATING SYSTEM

Gerd S. von Heydekampf, Ridley Park, Pa., assignor to Baldwin-Southwark Corporation, a corporation of Delaware Application June 29, 1933, Serial No. 678,240

21 Claims. (Cl. 265—47)

This invention relates generally to load weighing and indicating systems for load producing apparatus and more particularly to improved load weighing and indicating systems for materials testing machines preferably of the hydraulic type.

Testing apparatus, such as materials testing machines, involves essentially three elements; one is the loading apparatus for applying load to a specimen, sometimes referred to as a load producing apparatus; the second is the apparatus for measuring the applied load, usually referred to as the load weighing system; and the third is the indicating mechanism, such as a pointer and dial or equivalent apparatus for indicating the value of the measured or weighed load. In the case of hydraulic type testing machines, the load is produced by pumping hydraulic fluid under pressure into a hydraulic cylinder containing a ram or piston, this ram being suitably connected to the specimen to produce a load thereon. The hydraulic pressure is weighed or measured by the weighing system and the measured load is then indicated on the indicating system as above described.

Different specimens may be subjected to different maximum loads or the same specimen may be subjected to a series of different loads, depending upon the character of the test or the tensile or compression strength of the specimen material. Hence if the load indicating system were adapted to register up to only one given maximum load, which we may assume would be equal to the maximum load producing capacity of the testing machine, then it is seen that for any loads applied to the specimen smaller than the maximum the indicating system would be only partially used. Such a system, of course, would be graduated on the basis of its maximum range with the usual number of divisions on the indicating dial, or equivalent mechanism, each division representing certain large increments of load. Hence any partial use of the system, such as up to small maximum loads, would require the value of the load to be taken from the divisions graduated on the basis of large load increments with consequent difficulty in reading the same closely, thus resulting in possibility of error. The smaller the load becomes, the greater would be the possible percentage of error for any reading. Hence it is particularly desirable to provide an indicating system having divisions of smaller values for the small loads and hence obtain a high degree of accuracy for either large or small loads, and to accomplish this I provide what are herein called multi-load range weighing and indicating systems arranged in an improved manner to avoid changing the index plates, dials or equivalent load indicators.

It is one object of my invention to provide an improved indicating system that effectively indicates and allows readings to be taken of small loads with an accuracy comparable to that for large loads.

It is another object of my invention to provide an improved multi-load range indicating system whereby a single indicating mechanism may be effectively and accurately used, preferably substantially in its entirety, for each of the plurality of different load ranges.

A further object is to provide an improved load weighing system having hydraulically responsive mechanism adapted to have its effective pressure area varied in accordance with the range of load desired to be indicated on suitable indicating mechanism.

In one specific aspect of the invention I accomplish the foregoing by providing a multiple plunger arrangement in a hydraulically responsive weighting system whereby one plunger is used alone for a certain load range and a plurality of plungers are used simultaneously for other load ranges.

More specifically the plungers are preferably concentrically arranged to telescope with each other and are adapted to be selectively connected, either alone or together, to a suitable load resisting element for measuring the load. Such a resisting element may be any one of various types such as a spring, pendulum balance, beam and poise or other load resisting arrangement.

A further object is to provide improved means for eliminating the friction of rest between the load responsive plunger or plungers and the cylinder and a more specific object in this aspect of the invention is to permit the friction eliminating means to function in an improved manner when either one or a plurality of plungers are used. A further object is to provide a relatively simple means whereby the single or multiple operation of the plungers may be alternatively selected.

Another object is to provide an improved multi-load range indicator adapted to cooperate with any suitable form of multi-load range weighing system used in connection therewith. For example in the disclosure herein, the springs may be replaced by a pendulum system in a well-known manner so that a component of the pendulum swing will be transmitted to the indicator. Such systems may be employed with beam and poise testing machines as well as with the so-called hydraulic pendulum type. A more specific object in this respect is to provide a dial with improved means to indicate the range lbs. capacity for which the system is set, to indicate the value of each subdivision on the dial for this setting and to indicate the set of springs to be used in the indicating mechanism for the particular setting of the system.

A further object is to provide a relatively simple indicating system whereby springs or other variable load resisting elements of different capacity may be substituted and to have each set of springs or resisting elements cooperate equally as well with the multiple plungers, it being understood that for each set of springs two or more load ranges may be effected by suitable adjustment of the multiple plungers.

Other objects and advantages will be more apparent to those skilled in the art from the following description of the accompanying drawings in which:

Fig. 1 is a rear elevational view of the indicating mechanism;

Fig. 2 is a partial side view of Fig. 1 but with the hydraulic responsive system shown in a section taken substantially on the line 2—2 of Fig. 1;

Fig. 3 is a front view of the multi-range single face indicating dial forming a part of my improved system, parts being broken away to show details of numbering arrangement;

Fig. 4 is a sectional view through the dial taken on line 4—4 of Fig. 3;

Figure 5:
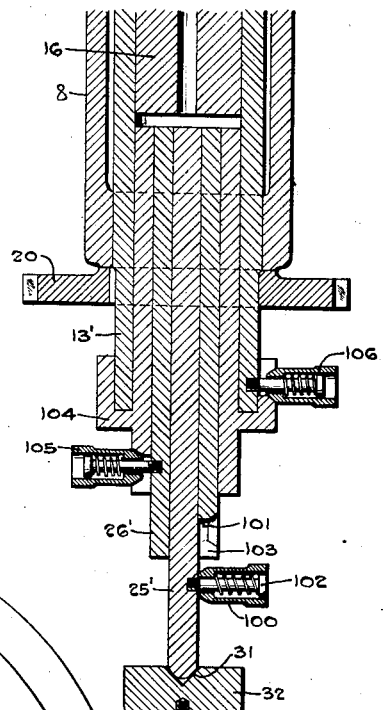
Fig. 5 is a modified multiple plunger.

In the illustrated embodiments of the invention which are shown herein merely for the purpose of disclosing certain specific forms among possible others that the invention might take, it will be understood that the invention is preferably employed with any suitable hydraulic type materials testing machine or other load producing mechanism arranged to create a hydraulic pressure in proportion to the load and that such pressure is measured either directly or indirectly by an improved weighing system and the load so weighed is indicated on an improved indicating system, the weighing and indicating systems forming the invention herein disclosed in distinction to the loading or load producing apparatus.

The indicating system comprises generally a multi-load range indicator mechanism such as a pointer and dial shown at 1. This is connected to a hydro-mechanical weighing system having a spring system generally indicated at 2 and a hydraulic pressure load responsive or transmitting system generally indicated at 3. These various elements are preferably but not necessarily supported upon a framework including a base 4, vertical standards 5 and 6 and a crosstie 7, all of which are formed of any suitable structural angle iron and welded together along their lines of juncture.

My improved load weighing system will now be described under the following captions (a) and (b).

(a) *Multi-load range hydraulic load transmitting system.*—Secured to and depending from base 4 is the hydraulic system 3 comprising an outer stationary, preferably cylindrical, guide housing 8 having an upper enlarged end removably secured to base 4 by bolts 9, preferably four in number. These bolts extend through a spacer head 10 interposed between cylinder 8 and base 4. The upper enlarged portion of cylinder 8 is provided with a recess 11 to form a shoulder on which is supported an annular ball bearing 12. Resting on top of this ball bearing, which includes of course the usual balls and ball races, is a constantly rotated cylinder 13 having a collar 14 threaded on its upper end to provide a suitable flange or shoulder for resting on ball bearing 12. While a ball bearing has been shown it will of course be understood that any other suitable type of bearing may be employed although a ball bearing is preferable. Rotatable cylinder 13 is guided at its lower end in a suitable plain bearing 15 of housing 8 and projects downwardly for an appreciable distance as shown. The upper end of cylinder 13 is laterally guided by a suitable central guide member or internal sleeve 16 having a relatively close running fit with cylinder 13, this guide member having preferably a pressed centering fit as at 17 in the interposed head 10. The uppermost end of guide member 16 is preferably slightly spaced from base 4 to avoid any undue strains being imposed on the guide member when bolts 9 are tightened. Any suitable fluid pressure connection such as an elbow 18 may be connected to the hollow bore in guide member 16 to transmit to cylinder 13 hydraulic pressure from any suitable load producing mechanism such as a materials testing machine.

Cylinder 13 is preferably constantly rotated during operation of the apparatus by gear 20 keyed thereto and adapted to be driven by a suitable pinion 21 and an electric motor 22. This motor may be supported in any suitable manner but is herein shown as carried by a bracket 23 removably secured to a suitable boss 24 formed on the side of stationary housing 8.

To obtain multiple load ranges, as hereinafter described, there is provided an inner plunger 25 preferably solid, having a lapped fit with an outer concentric sleeve plunger 26 which in turn also has a preferably lapped fit with the bore of cylinder 13. The lower end of sleeve plunger 26 is provided with an integral L-shaped collar 27 adapted to have detachable threaded engagement 28 with the outer lower portion of cylinder 13. Plunger 25 is also adapted to be brought into fixed relation to its cooperating sleeve plunger 26 by threads 29 engaging threads 30 in a suitable recess within the lower end of sleeve plunger 26.

The lower end of plunger 25 is of sufficient length so that whether or not it is secured to threads 30 it will rest in butt engagement with a suitable recess 31 in a crosshead 32 which as shown in Fig. 1 is secured to a pair of rods 33 and 34. These rods extend upwardly through base 4 and mechanical limit stops in the form of sleeves 35 and 36 preferably welded to base 4. The upper end of rods 33 and 34 are connected to a crosshead 37 to which the spring system 2 is connected. As shown in Fig. 1 rods 33 and 34 are removably secured to crossheads 32 and 37 by the provision of suitable shoulders on the rods and nuts therefor. It will also be noted that the rods are positively guided by the stationary housing 8 through two sets of guide rollers preferably ball bearings 39 and 40 journalled in suitable bosses on the housing, each set of rollers comprising a pair disposed on opposite sides of the rods.

(b) *Load resisting element.*—While a spring type load resisting mechanism has been specifically disclosed, yet it will be understood that my invention is equally adapted to other types of load resisting systems having variable or multi-load ranges.

The spring system, herein disclosed, includes a chassis having an upper supporting link or tongue 41 suitably pivotally supported, preferably through a knife edge, between the spaced members forming crosstie 7. Link 41 is formed preferably as part of a transverse arm 42 to which is secured a pair of relatively flat vertical plates 43 transversely spaced and connected at their lower ends by an arcuate end stop 44. A pair of links 45 are pivotally connected to the outwardly projecting ends of arm 42 to support a set of springs 46 preferably of a type known as Iso-Elastic springs. This set of springs comprises two pairs, each pair having interconnected individual springs coiled in opposite directions. The lower end of each pair of springs is pivotally connected through links 47 to a vertically movable crosshead 48 having a lower surface conforming to stop plate 43. While this lower surface and plate are shown as curved, yet they may have any other suitable form. A tongue or link 49 is secured to and projects downwardly from crosshead 48 through a suitable opening 50 in stop plate 44. This link is pivotally connected as at 51, preferably a knife edge, to suitable lugs 52 welded or otherwise secured to crosshead 37 of the hydraulic system 3. As the hydraulic system pulls down on crosshead 37, then tongue 49 and crosshead 48 will likewise be pulled down between plates 43 preferably without touching same thereby avoiding friction. The upper ends of the springs are operatively supported by housing 8 through elements 42, 41, 5, 6 and 4 thereby completing the chain of elements through which the reaction forces of the plungers travel.

*Load indicator mechanism—(Dial system).*— When crosshead 48 moves up or down it carries therewith an arm 60 extending an appreciable distance upwardly to support a bi-metallic strip 61 to which is pivotally supported a rack bar 62. This rack is preferably inclined slightly outwardly so that with its lower end free it may have a constant slight gravity pressure against a pinion 63 which is secured to a shaft for a pointer 64, Fig. 3. This shaft is journalled in vertical plates 43. A dial face 65, which specifically might be considered a window dial, is supported in any suitable stationary manner, preferably by a series of screws and spacing washers generally indicated at 66 connected to the vertical chassis plate 43 disposed on the front side of the apparatus. The dial is held concentric to the pointer shaft by the provision, Fig. 4, of a small bushing 67 also secured to front plate 43 and through which the pointer shaft extends. There is journalled upon bushing 67 a load index dial 68 adapted to have limited angular movement determined by the length of arcuate slots 69 formed therein by the through which the screw and spacer elements 66 pass to serve as a limit for angular movement of disc 68. It will be noted that the series of pins and spacer sleeves 66 are preferably in vertical alignment as shown although other arrangements may be employed if desired.

To effect different angular positions of dial 68, a finger hole 70 formed in disc 68, or if desired a pin secured to disc 68, is adapted to be reached by the finger through an arcuate slot 71 in dial 65. The hole 70 may be engaged by the operator's finger so as to move dial 68 against the yieldable action of a detent pin 72, Fig. 1, and recesses 73 formed in the periphery of disc 68, pin 72 being supported on stationary dial 65. Each one of recesses 73 corresponds to different load ranges as will be described hereinafter.

A usual maximum load hand 64' may be freely journalled on bushing 67 independently of the shaft for pointer 64. The free end of pointer 64 is bent inwardly toward the face of dial 65 so as to engage maximum hand 64' and push the same in a clockwise direction. However, upon counterclockwise movement of pointer 64, pointer 64' will be left in the position to which it has been moved, thereby indicating the maximum load.

*Plunger operation.*—In the position of the hydraulic plungers 25 and 26 shown in Fig. 2, the indicating mechanism is in its zero position. As load is applied to the hydraulic testing machine or other weighing apparatus that might be employed, hydraulic pressure is transmitted either directly or indirectly from such machine or apparatus through suitable piping to inlet 18 and cylinder 13. As the load on the testing machine increases, hydraulic pressure correspondingly increases within cylinder 13 to cause center plunger 25 to move downwardly by itself within cylinder plunger sleeve 26 which, during this operation, is held in fixed relation to cylinder 13 through collar 27 and threads 28. As the plunger moves downwardly, crosshead 32 is likewise moved downwardly together with rods 33 and 34. Crosshead 37 in turn pulls down on tongue 49 and crosshead 48 against the tension of springs 46 which are held against movement at their upper ends by links 45 and fixed crosshead 44. Downward movement of crosshead 48 causes an arm 60 to move gear rack 62 downwardly and thus rotate pinion 63 and pointer 64, Fig. 3.

To limit movement of the hydraulic system, sleeves 35 and 36 are provided to engage crosshead 37 when it has moved downwardly a predetermined distance. Also when the hydraulic system has moved to this extent, a normally closed switch specifically in the form of a pivoted mercury switch generally indicated at 80, is opened by an adjustable pin 81 carried on crosshead 37 to completely shut down operation of all motor actuated elements involved in the system. To reestablish the circuits it is first necessary to release the load pressure on the hydraulic testing machine whereupon the hydraulic system will rise by virtue of springs 46 pulling upwardly on head 48 and when it has moved upwardly sufficiently to cause an adjustable pin 82 to close a normally open switch 83, specifically in the form of a pivoted mercury switch, then the motors of the entire apparatus may be restarted. Immediately upon downward movement of crosshead 37, pivoted switch 83 will open by gravity but by the use of suitable relays for such a situation the circuits for the motors will remain closed until later opened by engagement of pin 81 with switch 80 or by manually interrupting the circuit in which said switch 80 is located.

Reverting again to the hydraulic plunger system 25 and 26, plunger 25 when operating alone, as shown in Fig. 2, represents one load range of the largest magnitude insofar as the plunger system is concerned. To obtain a load range of smaller magnitude, sleeve plunger 26 is released from its threaded engagement 28 with cylinder 13 and secured to plunger 25 by screwing threads 29 and 30 together. Thus plungers 25 and 26 now form a single rigid unit adapted to move simultaneously within cylinder 13. It is thus seen that the effective area of the plunger is increased over the above operation where only plunger 25 operates. Thus for a relatively small load on the testing machine a relatively large total pressure will be exerted on the combined plungers to move the same more easily and to a greater extent against the spring 46 than would be possible if plunger 25 were operating alone, as in this latter case the total plunger force acting against springs 46 would be too small to result in any appreciable movement of the spring and indicating systems.

*Friction eliminating means.*—In order to insure maximum accuracy in this system, I have provided improved means for eliminating friction of rest between plungers 25, 26 and cylinder 13 irrespective of whether one plunger or both are operating. This is effected by rotating cylinder 13 through motor 22 and pinion 21 which meshes with gear 20 keyed to cylinder 13. During operation of the indicating system, motor 22 and cylinder 13 are continuously rotated. Hence with plunger sleeve 26 secured to cylinder 13 through collar 27 and threads 28, it is seen that sleeve plunger 26 will be rotated with cylinder 13 about plunger 25, thus eliminating friction of rest between plunger 25 and sleeve 26. On the other hand, when both plungers are connected together for simultaneous use as by unscrewing collar 27 from threads 28 and connecting threads 29 and 30, it is seen that cylinder 13 will now rotate about sleeve 26, thereby eliminating friction of rest between sleeve 26 and cylinder 13. In this manner the only element of friction is a slight axial component of moving friction which is relatively small and in any event is constant so that the system or readings may be compensated therefor if desired, although in most cases this slight axial component of friction is so small as to be negligible in practically all tests.

*Coordinated dial and plunger operation.*— From the foregoing it is seen that if a specimen is to be subjected, we will say, to a relatively large load, then plunger 25 is used alone thereby causing pointer 64 to move a small distance over the dial system for each increment of load whereas if for the same load both plunger 25 and 26 were employed, then pointer 64 would travel a multiple of that distance in the ratio of the plunger areas. Hence it is desirable that suitable indicator means be provided in the indicating system whereby the unit values for single or multiple load ranges may be selected without necessitating mental interpolations or other calculations.

To accomplish this I have provided an improved dial arrangement adapted to cooperate with any of the load weighing systems herein referred to. For instance, when the range capacity of the test is to be, for example 1000 pounds, index disc 68 is rotated by the operator inserting his finger in hole 70 and moving the dial to the position shown in Fig. 3 whereupon the number "1000" will either appear alone in a window opening 86 of a stationary window dial 65 or appear in said window opposite an arrow 86'. The number "1000" is printed on the face of number dial 68 so as to rotate therewith. Also simultaneously with this "1000" lbs. setting, there will appear in window 87 a number "1" denoting the pound value of each subdivision generally indicated at 89 on stationary disc 65. This value is the unit value for the selected load range, and such value is different for each load range. There will also simultaneously appear in window 90 the number "1" or other suitable denomination indicating the capacity of weighing springs 46 to be used for the "1000" lbs. range capacity, it being understood that springs 46 are removable from the crossheads 44 and 48 to permit springs of various capacities to be substituted thereby allowing a large number of range capacities to be obtained in addition to those effected by the multiple plunger 25 and 26. Simultaneously with the above adjustment of the dial system, there will appear a series of numbers in the several windows 91 placed preferably entirely around dial 65 as shown. The numbers appearing in these windows represent the load in pounds applied by the testing machine to the specimen. The operator will of course be instructed to use the plungers 25 and 26 together when the range pounds capacity is 1000 pounds although this instruction may also be placed on dial 68 to appear through a suitable opening in dial 65. With the foregoing setting, pointer 64 may start from zero and pass entirely around the dial past the number "900" and "950" and back to the zero point to give a total range of 1000 pounds.

If now it is desired to increase the range pounds capacity without substituting another set of springs 46, plunger 25 may be used alone and collar 27 secured to cylinder 13 through its threads 28. The operator will then move finger hole 70 until detent pin 72 engages the next recess 73. Index dial 68 will then cause index numbers "5000", "5" and "1" to appear respectively in windows 86, 87 and 90 and also indicate if desired that only one plunger is to be used. Simultaneously with this change the values in windows 91 will be five times larger than the previous setting. Naturally the zero value will remain unchanged at the lowermost of the windows 91. The figures of this example are based on the assumption that the combined area of the plungers 25 and 26 is five times the area of the small plunger 25. However, it will be understood that any desired ratio may be employed and that the dial figures would be made accordingly.

If it is desired to change the range of the apparatus still further, then springs 46 must be removed and larger or smaller capacity springs substituted. The size of the necessary spring to be used for a given range appears in window 90 when disc 68 is rotated to the desired range capacity which appears in window 86. As many sets of springs may be ready for substitution as desired but, as shown, dial 68 is indexed for only two sets of springs with the two alternative range selections for each set of springs as effected by the double plunger system as shown in Fig. 2. The single plunger operation or large load range values for one set of springs are generally shown on the number dial at *a* while the double plunger operation or lower load range values for this same set of springs are generally *a'*. If a new set of springs are substituted then the high range value for single plunger operation is shown at *b* while the low load range numbers for this same set of springs are shown at *b'*.

It is desirable to be able either to calibrate springs 46 or to check their calibration by the use of a known deadweight, and to accomplish this in a relatively simple and yet positive manner without interference from the hydraulic plunger system, I have provided an eye 93 secured to crosshead 32. Thus when a deadweight is attached to crosshead 32 it will be moved away from and entirely clear of plunger 25 due to the butt engagement between seat 31 and the plunger.

Also if desired an autographic recorder generally indicated at 94 may be supported upon any suitable base and actuated by a suitable flexible member such as a string 95 passing over the drum of the recorder, thence over pulleys 95, 96 and 97, Fig. 1, the two ends of this string being provided with weights 98 and 99 to maintain the string taut but not impose any unbalance therein. Pulley 96 is attached to the pointer shaft so that movement of the pointer will actuate said string and accordingly cause rotation of the autographic recorder drum 94.

*Modifications.*—As shown in Fig. 5 the multiple plunger system may be enlarged beyond two plungers merely by carrying out the principle shown in Fig. 2. For example, a plunger 25' is adapted to have releasable engagement with a sleeve plunger 26' through a spring-held, preferably tapered, latch sleeve 100 whose guide stem 102 is secured in plunger 25' and extends through a suitable latch opening 101 in sleeve 26'. To detach plunger 25' from sleeve 26' it is only necessary to move latch member 100 outwardly free of opening 101 and then drop stem 102 downwardly through a vertical slot 103 which connects with opening 101. Similarly, sleeve 26' may be detachably connected to a sleeve plunger 104 by a releasable latch 105. From this it is seen that sleeve plunger 26' may be detached from plunger 104 by manipulation of latch 105 and then connected to center plunger 25' as by latch 100, whereupon these two plungers will operate as a unit. Likewise plunger 104 may be released from cylinder 13' by manipulation of latch 106 and then connected to sleeve 26' through latch 105, the three plungers thereupon being secured together as a unit. From this it is seen that any number of plungers may be employed and connected together in the manner shown. Also, rotation of cylinder 13' will be transmitted to each of the plungers so as to eliminate friction of rest for any combination of the plungers. Any suitable casing 110', Fig. 2, may enclose the indicating apparatus.

Figure 6:
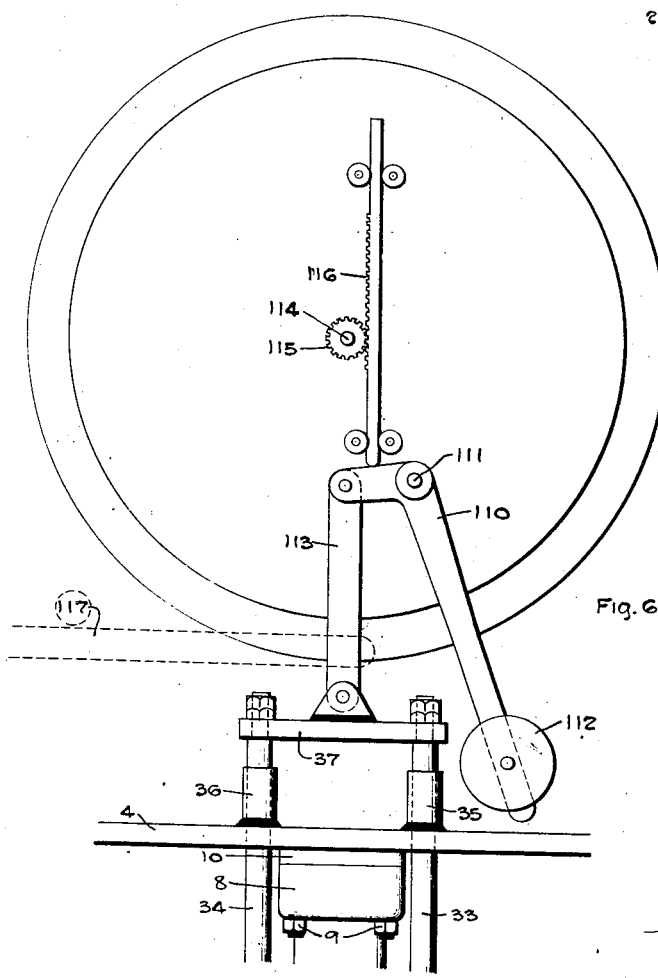
Fig. 6 is a further modification showing the application of my improved apparatus to mechanical weighing devices of the pendulum or beam and poise types.

My improved multi-range indicator means specifically shown in the form of a single face dial may be applied to a load weighing system of the pendulum type including as diagrammatically shown in Fig. 6 a bellcrank pendulum arm 110 pivotally connected at 111 to any suitable support. The long arm of the bellcrank is adapted in any usual manner to have any one of a series of different bobs 112 removably secured to arm 110, or if desired the bobs or weights may be placed at different points along the arm to effect different torque values corresponding to various weighing or load range capacities desired. The other arm of the bellcrank is suitably connected to a link 113 corresponding broadly to link or tongue 49 of the preferred form. Link 113 is pivotally secured to a crosshead such as 37 of the preferred form and is accordingly given the same reference number. It will, however, be understood that the hydraulic system may be either of the single or multiple plunger type. In either event, however, the pointer shaft 114 may have its pinion 115 actuated by a suitable rack 116 vertically guided in any suitable manner so as to remain in contact with the short arm of the bellcrank and accordingly be actuated thereby upon swinging of the pendulum in response to different loads.

It is seen that if different load ranges are desired, then the indicating system, whether it be of the dial, drum or other type, may be manipulated in accordance with the previous disclosure herein.

Also if it is desired to apply my improved dial to a beam and poise type of weighing machine, the beam may be connected to link 113 in place of the hydraulic system, thereby omitting the pivotal connection to crosshead 37.

From the foregoing disclosure of the several modifications, it is seen that the spring system together with the hydraulic system, or the pendulum system in cooperation with either the hydraulic system or the beam and poise system, constitute broadly a multi-load range load weighing system.

From the foregoing disclosure it is seen that I have provided a relatively simple and novel arrangement for causing an indicating system to have great flexibility of use together with a high degree of accuracy irrespective of the magnitude of the load ranges. It is also seen that a very effective system has been provided for insuring the utmost ease in determining the proper relation of elements for any given setting of the machine. Other advantages of my improved invention have been fully set forth hereinbefore such as the means for eliminating friction of rest for any one or more of the plungers together with improved mechanical and electrical safety elements for limiting operation of the equipment to prevent injury thereto.

It will of course be understood by those skilled in the art that various changes may be made in the details of construction and arrangement of parts without departing from the spirit of the invention as set forth in the appended claims.

I claim:

1. A system for weighing and indicating the load of a hydraulic load producing apparatus comprising, in combination, a weighing mechanism including a force resisting element and load responsive means acting against said element and operated by fluid pressure; means for transmitting load weighing pressure fluid thereto; mechanism for indicating the weighed load; and means whereby the effective pressure area of said responsive means may be varied to effect different load ranges for said weighing mechanism.

2. A system for weighing and indicating the load of a load producing apparatus comprising, in combination, a weighing mechanism including a force resisting element and load responsive fluid pressure operated plunger means acting against said element; means for transmitting load weighing pressure fluid thereto; a mechanism for indicating the weighed load; and means whereby the effective pressure area of said plunger means may be varied to effect different load ranges for said weighing mechanism.

3. A system for weighing and indicating the load of a load producing apparatus comprising, in combination, a weighing mechanism including a force resisting element, a cylinder and a plurality of load responsive fluid pressure operated plungers therein acting against said element; means for transmitting load weighing pressure fluid to said cylinder; a mechanism for indicating the weighed load; and means whereby said plungers may be selectively employed to effect different load ranges for the weighing mechanism.

4. A system for weighing and indicating the load of a load producing apparatus comprising, in combination, a weighing mechanism including a force resisting element, a cylinder and a plurality of load responsive fluid pressure operated concentric plungers therein acting against said element; means for transmitting load weighing pressure fluid to said cylinder; a mechanism for indicating the weighed load; and means for selectively controlling said plungers for either single or multiple operation thereby to effect different load ranges for the weighing mechanism.

5. A system for weighing the load of a load producing apparatus comprising, in combination, a load resisting element, a cylinder, a plurality of plungers therein operatively connected to said element, means for supplying pressure fluid to said cylinder from the load producing apparatus, means for selectively effecting single or multiple responsiveness of said plungers to fluid pressure in said cylinder thereby to produce different load ranges, and means for rotating said cylinder to eliminate friction of rest acting on said plungers during either single or multiple operation thereof.

6. A system for weighing the load of a load producing apparatus comprising, in combination, a load resisting element, a cylinder, a plurality of concentric plungers therein operatively connected to said element, means for supplying pressure fluid to said cylinder from the load producing apparatus, means for securing one of said plungers to said cylinder while permitting the other plunger to have axial movement, and means for securing both of said plungers together for axial movement as a unit.

7. A system for weighing the load of a load producing apparatus comprising, in combination, a cylinder, a plurality of concentric plungers therein operatively connected to said element, means for supplying pressure fluid to said cylinder from the load producing apparatus, means for securing one of said plungers to said cylinder while permitting the other plunger to have axial movement, means for securing both of said plungers together for axial movement as a unit, and means for effecting relative rotation between said plungers when one of the same is secured to said cylinder or between said plungers and cylinder when both the plungers are secured together.

8. A load weighing and indicating system for a load producing apparatus comprising, in combination, a weighing system having hydraulic responsive means, means whereby said hydraulic responsive means has a plurality of selective load ranges each operable substantially throughout normal movement of the weighing system and each beginning with substantially zero load value, indicator means having a plurality of load ranges of different unit value corresponding respectively to the different load ranges of the weighing system and each load range of said indicator means also beginning with substantially zero load value, and means whereby said indicator means indicates at any one time only the values corresponding to the selected range of said hydraulic system.

9. A load weighing and indicating system for a load producing apparatus comprising, in combination, a weighing system having hydraulic responsive means, means whereby said hydraulic means has a plurality of load ranges each operable substantially throughout normal movement of the system and each beginning with substantially zero load value, multi-load range indicator means operated by said weighing means including a plurality of superimposed members adapted for use with a plurality of load ranges each of different unit value and corresponding respectively to the load ranges of the weighing means, and means whereby one of said superimposed members is adapted to permit the use of only one load range indication at a time.

10. A load weighing and indicating system for a load producing apparatus comprising, in combination, a weighing system having a plurality of load ranges each operable substantially throughout normal movement of the system and each beginning with a substantially zero load value, a multi-load range indicating system having a plurality of sets of numbered load divisions of different unit value each beginning with a substantially zero load value and corresponding respectively to the multi-load ranges of said weighing system, and means for rendering only certain of said sets of numbered load divisions operative depending upon which range is employed.

11. A load weighing and indicating apparatus for a load producing device comprising, in combination, a weighing system having load responsive means provided with multi-load ranges each of which is operable throughout the same normal movement, a spring system for resisting movement of said load responsive means, a multi-load range indicating means, and means for selectively indicating different unit values of transmitted load in accordance with the particular load range that is in operation and for indicating the range pounds capacity for which the apparatus is to be used.

12. The combination set forth in claim 11 further characterized in that said indicating system has provision for also indicating numerically the unit value of the selected load range.

13. A load weighing and indicating system for load producing apparatus comprising, in combination, a housing containing a cylinder, a plunger reciprocable therein, a crosshead and load transmitting rods operatively connected to said plunger, rollers carried by said housing for guiding said rods, and a load resisting system and a load indicating system each operatively connected to said rods.

14. A load weighing and indicating system for load producing apparatus comprising, in combination, a weighing system including a force resisting element and a hydraulic load responsive system having a cylinder, a plunger in said cylinder, side rods operatively connected to said plunger, and a crosshead connecting said rods at one end thereof; mechanical stop limit elements interposed between said cylinder and crosshead for engaging the latter upon a predetermined movement thereof; and a load indicator system operatively connected to said hydraulic system and to said force resisting element.

15. A system for weighing the load of a load producing apparatus comprising, in combination, a load weighing mechanism having a load resisting element, a hydraulic cylinder, a plurality of plungers therein, means for transmitting weighing pressure fluid to said cylinder for operating said plungers, means for selectively controlling said plungers for single or multiple operation thereby to vary the responsive hydraulic pressure area of said plungers, means for operatively connecting said plungers to said resisting element and maintaining said connection during either single or multiple plunger operation, and means for effecting relative rotation between said cylinder and plungers thereby to eliminate friction of rest acting on said plungers during either single or multiple operation thereof.

16. A system for weighing the load of a load producing apparatus comprising, in combination, a load weighing mechanism having a load resisting element, a hydraulic cylinder, a plurality of concentric plungers therein, means for transmitting weighing pressure fluid to said cylinder for operating said plungers, means for selectively effecting relative rotation between said outer plunger and cylinder or between said plungers, and means for operatively connecting said plungers to said resisting element during either of said relative rotations.

17. A system for weighing the load of a load producing apparatus comprising, in combination, a load weighing mechanism having a load resisting element, a hydraulic cylinder, a plurality of concentric plungers therein both movable through one end of said cylinder, means for transmitting weighing pressure fluid to said cylinder for operating said plungers, means for selectively controlling said plungers to effect either single or multiple operation thereof, means for effecting relative rotation between said outer plunger and cylinder during multiple plunger operation and between said plungers during single plunger operation, and means for operatively connecting said plungers to said resisting element during either of said relative rotations.

18. A load weighing system for a hydraulic load producing apparatus comprising, in combination, a cylinder, a plurality of concentric plungers therein extending through one end of said cylinder, a sleeve associated with the other end of said cylinder for rotatably supporting the same, and means for rotating said cylinder.

19. The combination set forth in claim 18 further characterized in that said sleeve is provided with a passageway through which pressure fluid is supplied to said cylinder from said hydraulic load producing apparatus.

20. A weighing system for a hydraulic load producing apparatus comprising, in combination, a housing, a cylinder journalled therein, a plurality of plungers disposed in said cylinder and extending through one end thereof, a sleeve associated with the other end of said cylinder, means whereby said sleeve rotatably supports said cylinder, and means for rotating said cylinder including an electric motor supported on said housing.

21. A system for weighing the load of a hydraulic load producing apparatus comprising, in combination, a load resisting element, a cylinder, a plurality of concentric plungers therein adapted to be operatively connected to said element, means for supplying pressure fluid to said cylinder from the load producing apparatus, and means for effecting one load range by holding one of said plungers against axial movement while the other plunger is adapted to move and for effecting another load range by permitting movement of both plungers.

GERD S. von HEYDEKAMPF.